Patented July 1, 1947

2,423,218

UNITED STATES PATENT OFFICE 2,423,218

POLYCYCLIC DIKETOPYRIMIDINES

Alfred W. Anish, Vestal, N. Y., assignor to General Aniline & Film Corporation, New York, N. Y., a corporation of Delaware No Drawing. Application December 7, 1945, Serial No. 633,538

16 Claims. (Cl. 260—260)

This invention relates to new polycyclic diketopyrimidines and to a method for their production. More particularly, the invention relates to compounds which may be represented by the following general formula:

I 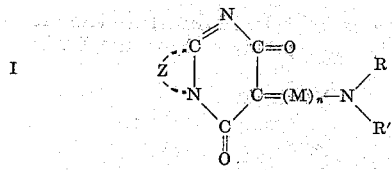

wherein M represents a methenyl group, Z represents the non-metallic atoms necessary to complete a heterocyclic nucleus, $n$ is a positive odd integer not greater than 5, R represents an aryl group selected from the benzene and naphthalene series and R' represents a hydrogen or acyl group.

These compounds readily react with heterocyclic compounds usual in cyanine dyes to form new merocyanine dyes, and are, therefore, highly valuable intermediates for the production of such dyes. These dyes are described more particularly in my application Serial No. 633,537, filed December 7, 1945.

More particularly, R, in formula I, may be, for example, phenyl, substituted phenyl as chlorophenyl, naphthyl or diphenyl. R' may be hydrogen or acyl group as, for instance, acetyl, propionyl, butyl or benzoyl.

Z, more particularly, represents the non-metallic atoms necessary to complete a heterocyclic nucleus such as of the thiazoline or selenazoline series, e. g. thiazoline or selenazoline; or of the thiazole series; e. g. hexahydrobenzthiazole; or of the pyrazolone series, e. g. 3-phenylpyrazolone; or of the pyridine or quinoline series, e. g. pyridine or quinoline, or of the thiazine series, such as thiazine.

The compounds of structure I may be prepared by reacting a compound having the following structure:

II 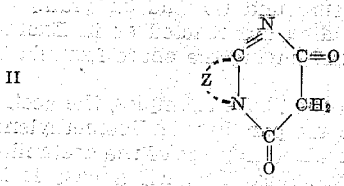

wherein Z has the same significance as indicated above with a compound having the following formula:

III      R''NH—(M)$_n$=N—R''' wherein M represents a methenyl group, $n$ is a positive odd integer not greater than 5 and R'' and R''' represent aryl groups, such as phenyl, naphthyl, diphenyl or xylyl.

More particularly, compound III may be (1) A diarylformamidine when it is desired to obtain a compound of structure I where $n$ is 1.

(2) An arylaminoacrolein anil, when it is desired to obtain a compound of structure I where $n$ is 3.

(3) A ω-arylamino-Δ2,4-pentadienal anil when it is desired to obtain a compound of structure I where $n$ is 5.

Compounds (2) and (3) are preferably utilized in the form of their salts, such, for instance, as their hydrochlorides. When the salts are employed the reaction is carried out in the presence of strong bases such as triethylamine, piperidine, diethylamine, N-methylpiperidine and triethanolamine. Other bases may also be employed as, for example, pyridine. The reactions can also be carried out in the presence of organic acid anhydrides, as for example, acetic, propionic and benzoic acid anhydrides.

When compounds of Formulas II and III are reacted, compounds of Formula I are obtained in which R' is hydrogen. The acylated derivatives of I are obtained, that is, compounds in which R' is acyl, by carrying out the reaction in the presence of an organic acid anhydride, such as acetic, propionic butyric or benzoic anhydrides. If desired, the reaction products of II and III may be first formed and then acylated to form the acylated derivatives.

In general, compounds II and III are utilized in equimolecular amounts, although a slight excess of either may be employed. Room temperatures may be employed. Heating facilitates the reaction. The reaction may be readily carried out at reflux temperatures. If desired, the reaction may be carried out in the presence of diluents, as for example, alcohol, kerosene or the bases or acylating agents may themselves serve as diluents.

Examples of compounds of Formula III and their salts are: diphenylformamidine, dinaphthylformamidine, dixylylformamidine, β-anilinoacrolein anil and its hydrochloride, β-anilino-α-chloroacrolein anil and its hydrochloride, β-anilino-α-bromo-acrolein anil and their hydrochlorides, and glutaconic-aldehyde dianilide hydrochloride.

The polycyclic compounds of the type illustrated by Formula II above, from which the compounds of this invention are produced, may be prepared from a large variety of starting materials. Any heterocyclic compound substituted by a primary amine group which readily undergoes the following tautomeric imino form will yield the corresponding bicyclic compound

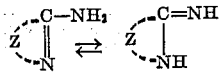

Z has the same significance as above.

In practice, the starting compounds illustrated by Formula II can be obtained by condensing the aforementioned amino-substituted heterocyclic compounds with ethyl malonate according to the procedure of Masters & Bogert, Journal of American Chemical Society, vol. 64 (1942), page 2709 or by the method described in Berichte vol. 57 (1924), page 1170.

More particularly, the process involved in preparing the intermediates of structure II comprises condensing amino-substituted heterocyclic compounds with ethyl malonate in the presence of alcoholic sodium ethylate. As examples of amino-substituted heterocyclic compounds which may be so converted into polycyclic compounds having the structure II, there may be mentioned 2-aminothiazoline, 2-aminoselenazoline, 2-aminodihydrothiazine, 2-amino-5-methylthiazoline, 2-amino-4-phenylthiazoline, 2-aminohexahydrobenzthiazole, 3-phenyl-5-aminopyrazolone and 2-aminopyridine. When these compounds are condensed with ethyl malonate in the manner described, they result in compounds which may be represented by the following structural formulas:

From 2-aminothiazoline

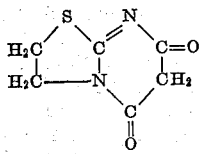 (a)

From 2-aminoselenazoline

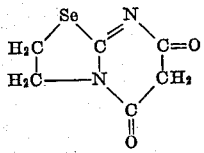 (b)

From 2-aminodihydrothiazine

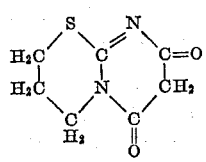 (c)

From 2-amino-5-methylthiazoline

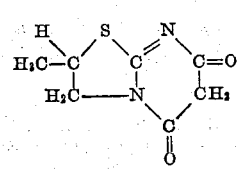 (d)

From 2-amino-4-phenylthiazoline

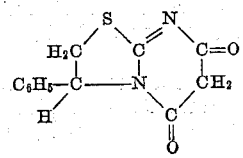 (e)

From 2-aminohexahydrobenzthiazole

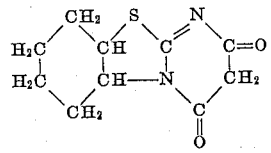 (f)

From 3-phenyl-5-aminopyrazolone

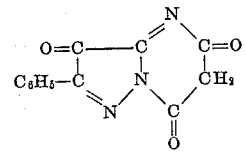 (g)

From 2-aminopyridine

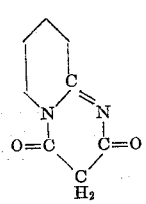 (h)

The following examples will illustrate the mode of producing the compounds of Formula I where n is one.

*Example 1*

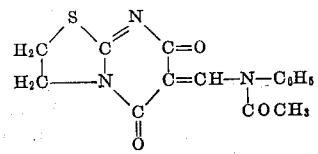

3.4 grams of compound (a) above, 3.9 grams of diphenyl formamidine and 30 cc. of acetic anhydride are refluxed for about one hour. A compound of the above formula separates from the reaction mixture and can be recrystallized from methyl alcohol.

*Example 2*

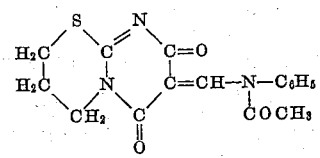

1.8 grams of compound (c) and 2 grams of diphenyl formamidine are reacted as in Example 1. A compound having the above formula is obtained.

*Example 3*

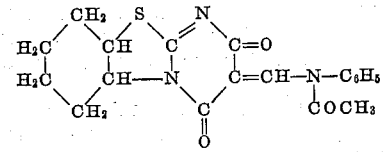

4.4 grams of compound (f) and 3.9 grams of diphenyl formamidine are reacted as in Example 1. A compound having the above formula is obtained.

By omitting, in the above examples, the acetic anhydride the corresponding anilinomethylene compounds are obtained in place of the acetanilidomethylene compounds. In such a case it is advantageous to carry out the reaction in the presence of a diluent as for example, kerosene.

In the same manner as that illustrated by the above examples, other compounds of structure II may be reacted with diarylformamides to produce the anilinomethlylene and acylanilidomethylene derivatives. Thus, for example, compounds (b), (d), (e), (g) and (h) may be treated in the same manner as illustrated by the above examples.

The following examples will illustrate the mode of producing the compounds of Formula I where n is 3.

*Example 4*

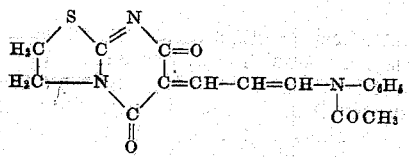

3.4 grams of compound (a), 5.2 grams of β-anilinoacrolein anil hydrochloride and 25 cc. of acetic anhydride are heated under reflux for about 1 hour. A compound of the above formula separates from the reaction mixture and can be recrystallized from methyl alcohol.

*Example 5*

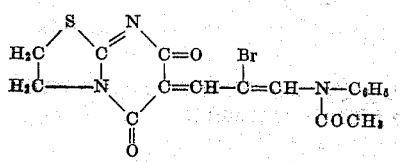

3.4 grams of compound (a) are allowed to react with 7 grams of β-anilino-α-bromo-acrolein anil hydrobromide in the presence of 30 cc. of acetic anhydride as in Example 4. A compound of the above formula is obtained.

*Example 6*

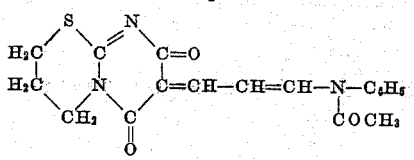

Equimolecular proportions of compound (c) and β-anilino-acrolein anil hydrochloride are treated as in Example 4. A compound of the above formula is obtained.

*Example 7*

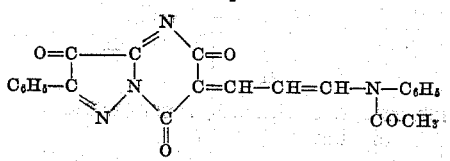

2.4 grams of compound (g), 2.6 grams of β-anilino-acrolein anil hydrochloride and 20 cc. of acetic anhydric are heated under reflux for about an hour. A compound of the above formula separates and can be recrystallized from methyl alcohol.

*Example 8*

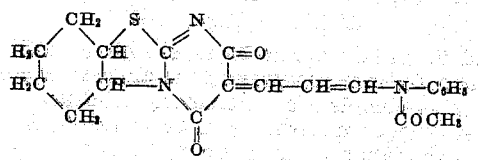

4.4 grams of compound (f) and 5.2 grams of β-anilino-acrolein anil hydrochloride are reacted as in Example 4. A compound having the above formula is obtained.

By omitting, in Examples 4–8, the acetic anhydride the corresponding γ-anilinoallylidene compounds are obtained instead of the γ-acetanilido-allylidene compounds. In such a case, reaction is preferably carried out in the presence of a strong organic base such as, for example, piperidine or triethylamine, preferably in an equimolecular amount, and a suitable diluent such as, for example, ethyl, n-propyl or isopropyl alcohol.

The γ-anilinoallylidene compound can then be converted to the corresponding γ-acylanilido-allylidene compound by acylating it with a suitable acylating agent such as acetic anhydride.

In the same manner as illustrated in Examples 4–8, other compounds of Formula II may be reacted with arylaminoacrolein anils and their salts to produce the γ-anilinoallylidene and γ-acylanilidoallylidene compounds. Thus, for examples, compounds (b), (d), (e) and (h) may be treated in the same manner as illustrated by Examples 4–8.

The following examples will illustrate the mode of producing the compounds for Formula I where n is 5.

*Example 9*

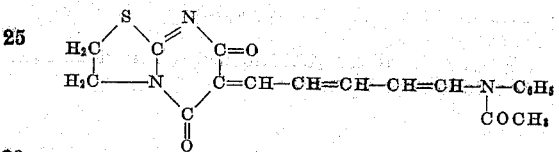

3.4 grams of compound (a), 5.6 grams of glutaconic aldehyde dianilide hydrochloride and 30 cc. of acetic anhydride are heated under reflux for about 1 hour. A compound of the above formula separates from the reaction mixture and can be recrystallized from methyl alcohol.

*Example 10*

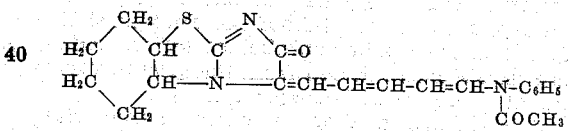

2.2 grams of compound (f) and 2.8 of glutaconic aldehyde dianilide hydrochloride are reacted as in Example 9. A compound having the above formula is obtained.

By omitting in Examples 9 and 10 the acetic anhydride the corresponding ω-anilino-Δ2,4-pentadienylidene compounds are obtained instead of the ω-acetanilido-Δ2,4-pentadienylidene compounds. In such a case the reaction is preferably carried out in the presence of a strong organic base such as, for example, piperidine or triethylamine, in preferably an equimolecular amount and a suitable diluent such as, for example, ethyl, n-propyl or iso-propyl alcohol. Thus, for example, by omitting the acetic anhydride in Example 9, and substituting therefor 50 cc. of isopropyl alcohol and 2 grams of triethylamine and refluxing for 20 minutes, one obtains a compound of the following formula:

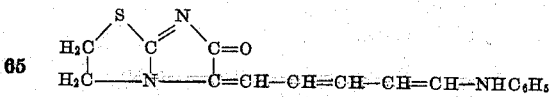

To produce the compound of Example 9, this is acylated by boiling with 55 cc. of acetic anhydride.

In the same manner as illustrated in Examples 9 and 10, other compounds of Formula II may be reacted with ω-arylamino-Δ2,4-pentadienal anils and their salts to produce the ω-anilino-Δ 2,4-pentadienylidene and ω-acylanilido-Δ2,4-pentadienylidene compounds. Thus, for example, compounds (b), (c), (d), (e), (g) and (h) may be treated in the same manner as illustrated by Examples 9 and 10.

In each of the above examples, the acetic anhydride may be substituted by propionic or benzoic anhydride as well as other anhydrides.

I claim:

1. Polycyclic diketopyrimidines characterized by the following formula:

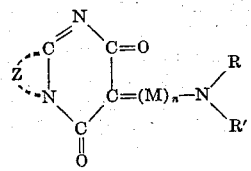

wherein M represents a methenyl group, Z represents the nonmetallic atoms necessary to complete a heterocyclic nucleus, n is a positive odd integer not greater than 5, R is an aryl group selected from the class consisting of the benzene and naphthalene series, and R' is a substituent selected from the group consisting of hydrogen and acyl groups.

2. Polycyclic diketopyrimidines characterized by the following formula:

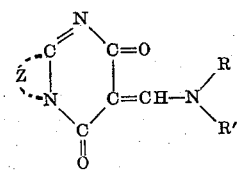

wherein Z represents the non-metallic atoms necessary to complete a heterocyclic nucleous, R is an aryl group selected from the class consisting of the benzene and naphthalene series, and R' is a substituent selected from the group consisting of hydrogen and acyl groups.

3. Polycyclic diketopyrimidines characterized by the following formula:

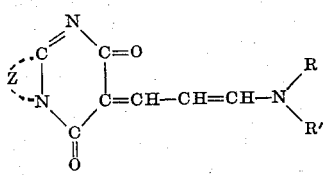

wherein Z represents the non-metallic atoms necessary to complete a heterocyclic nucleus, R is an aryl group selected from the class consisting of the benzene and naphthalene series, and R' is a substituent selected from the group consisting of hydrogen and acyl groups.

4. Polycyclic diketopyrimidines characterized by the following formula:

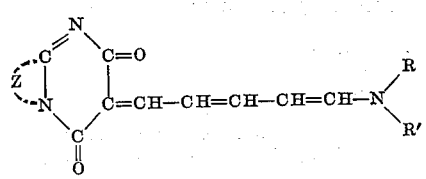

where Z represents the non-metallic atoms necessary to complete a heterocyclic nucleus, R is an aryl group selected from the class consisting of the benzene and naphthalene series, and R' is a substituent selected from the group consisting of hydrogen and acyl groups.

5. Polycyclic diketopyrimidines characterized by the following formula:

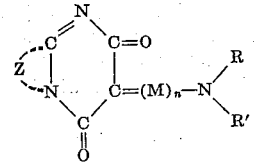

wherein M represents a methenyl group, Z represents the non-metallic atoms necessary to complete a thiazole nucleus, n is a positive odd integer not greater than 5, R is an aryl group selected from the class consisting of the benzene and naphthalene series, and R' is a substituent selected from the group consisting of hydrogen and acyl groups.

6. A polycyclic diketopyrimidine characterized by the following formula:

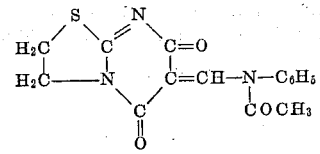

7. A polycyclic diketopyrimidine characterized by the following formula:

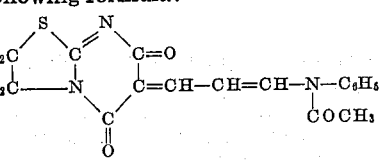

8. A polycyclic diketopyrimidine characterized by the following formula:

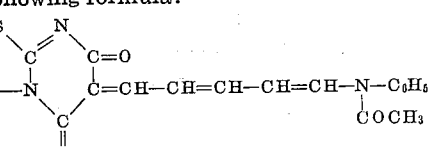

9. A method of producing a compound having the following formula:

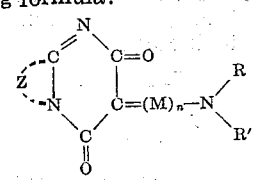

which comprises reacting a compound of the following formula:

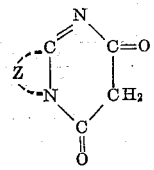

with a compound of the following formula:

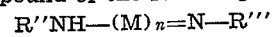

and its salts, wherein M represents a methenyl group, Z represents the non-metallic atoms necessary to complete a heterocyclic nucleus, n is a positive odd integer not greater than 5, R, R'' and R''' represent an aryl group selected from the class consisting of the benzene and naphthalene series and R' is a substituent selected from the group consisting of hydrogen and acyl groups.

10. A method as in claim 9 wherein n equals 1.
11. A method as in claim 9 wherein n equals 3.
12. A method as in claim 9 wherein n equals 5.

13. A method as in claim 9 wherein Z represents the non-metallic atoms necessary to complete a thiazole nucleus.

14. A process which comprises reacting

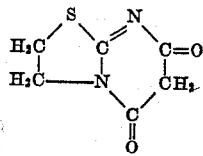

with diphenylformamidine in the presence of acetic anhydride.

15. A process which comprises reacting

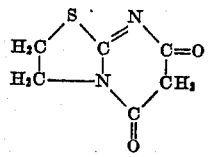

with β-anilinoacrolein anil hydrochloride in the presence of acetic anhydride.

16. A process which comprises reacting:

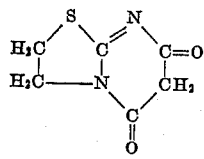

with glutaconic aldehyde dianilide hydrochloride in the presence of acetic anhydride.

ALFRED W. ANISH.